United States Patent [19]

Kida

[11] Patent Number: 5,249,239
[45] Date of Patent: Sep. 28, 1993

[54] MEANS FOR MEASURING COPLANARITY OF LEADS ON AN IC PACKAGE

[75] Inventor: Tomoyuki Kida, Tokyo, Japan
[73] Assignee: NEC Corporation, Japan
[21] Appl. No.: 729,921
[22] Filed: Jul. 15, 1991
[30] Foreign Application Priority Data
Jul. 17, 1990 [JP] Japan .................. 2-188868
[51] Int. Cl.⁵ .................................. G06K 9/00
[52] U.S. Cl. ..................... 382/8; 382/47; 358/101; 358/107; 359/710
[58] Field of Search ............... 382/8, 44, 47; 358/101, 358/106, 107; 359/668, 669, 670, 710; 356/237

[56] References Cited

U.S. PATENT DOCUMENTS

| | | | |
|---|---|---|---|
| 4,158,134 | 6/1979 | Martin et al. | 250/216 |
| 4,277,441 | 7/1981 | Sachs | 422/105 |
| 4,696,047 | 9/1987 | Christian et al. | 382/8 |
| 4,772,125 | 9/1988 | Yoshimura et al. | 356/237 |
| 4,906,099 | 3/1990 | Casasent | 356/394 |
| 5,125,052 | 6/1992 | Lehureau et al. | 385/33 |

FOREIGN PATENT DOCUMENTS 57-204018 12/1982 Japan .................. 359/668

Primary Examiner—David K. Moore
Assistant Examiner—Andrew W. Johns
Attorney, Agent, or Firm—Laff, Whitesel Conte & Saret

[57] ABSTRACT

A coplanarity measuring apparatus includes an image converting section, an optical lens mechanism, an image processing section, and an arithmetic operating section. The image converting section converts a transmission image of lead end portions of a surface-mount type IC package into image data. The optical lens mechanism vertically enlarges a transmission image, of the lead end portions, which is projected by the image converting section, and horizontally reduces the vertically enlarged transmission image. The image processing section converts the image data output from the image converting section into binary data and forming a profile. The arithmetic operating section calculates a coplanarity from the profile formed by the image processing section and checks whether a product is defective.

7 Claims, 6 Drawing Sheets

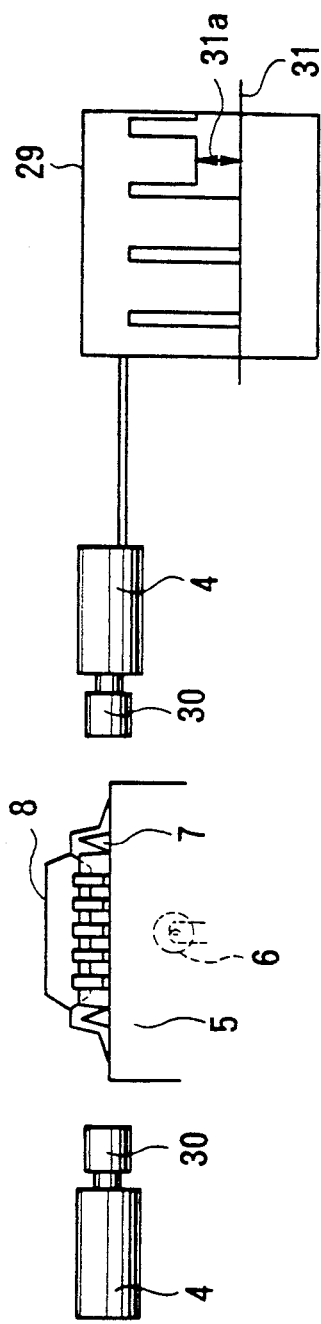
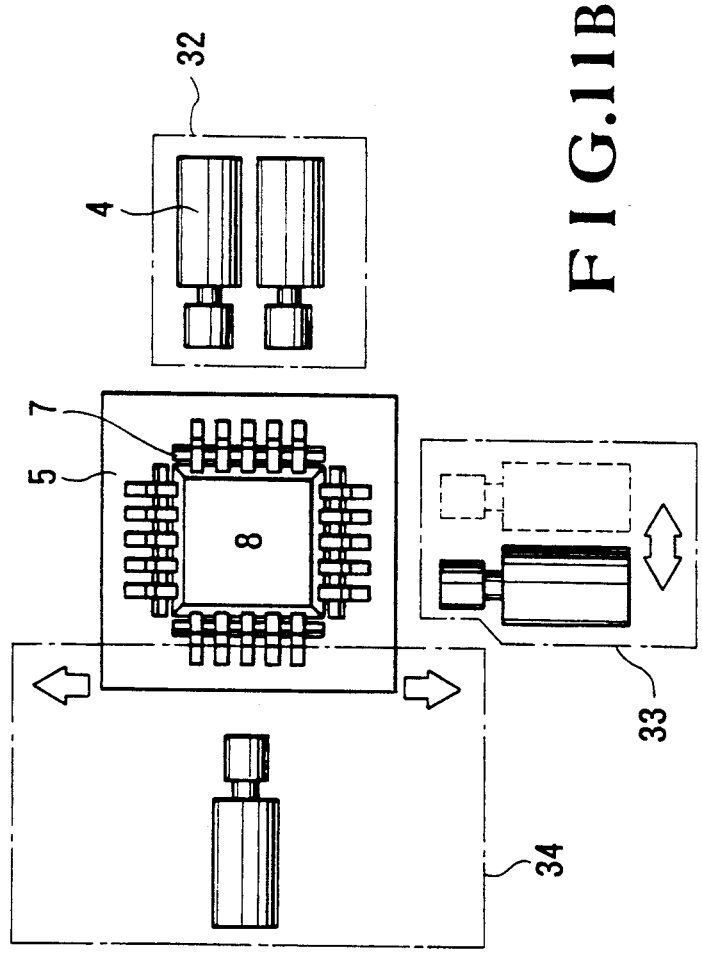
FIG.11A
FIG.11B

MEANS FOR MEASURING COPLANARITY OF LEADS ON AN IC PACKAGE

BACKGROUND OF THE INVENTION

The present invention relates to a coplanarity measuring apparatus for measuring the coplanarity of the leads of a surface-mount type IC package (to be referred to as an SMD hereinafter).

An apparatus similar to a coplanarity measuring apparatus of this type has been proposed. In such an apparatus, as shown in FIG. 11A, a light source 6 and a semitranslucent diffusion resin 7 are used to radiate light from the inside of an SMD 8 mounted on a flat stage 5. A transmission image, of lead end portions, obtained by the radiation is photographed by a camera 4 to obtain a binary image 29. A distance 31a (float amount) between a dark point group representing each lead and a dark line 31 is calculated by using the binary image 29. The maximum value is then retrieved from all the calculation results. A coplanarity is obtained by multiplying the maximum value by the resolution of the camera 4.

In a coplanarity measuring apparatus of this type, a high-magnification macro lens 30 is used for the camera 4 to realize a camera system resolution of 10 $\mu$m/pixel (in the vertical and horizontal directions). For this reason, when the SMD 8 having a lead width of 0.8 mm and a lead pitch of 0.65 mm is to be measured, three or four pins are photographed within the field of view in each framing. Therefore, image processing and coplanarity calculation have been performed by the following three schemes: arranging a plurality of cameras 4 along one side of the SMD 8 (reference numeral 32 in FIG. 11B); shifting the camera 4 in a direction parallel to a side of the SMD 8 by using a stepping motor or a servo motor (reference numeral 33 in FIG. 11B); and moving the flat stage 5 in a direction parallel to the camera 4 while the SMD 8 is mounted on the stage 5 (reference numeral 34 in FIG. 11B).

Referring to FIG. 11A, in the coplanarity measuring apparatus, since the camera 4 is equipped with the high-magnification macro lens 30 to realize a precision of 10 $\mu$m/pixel in the vertical direction, the horizontal resolution also becomes 10 $\mu$m/pixel, i.e., the field of view is undesirably reduced. For this reason, in order to obtain the float amounts of all leads, a plurality of cameras 4 must be installed along one side of the SMD 8 (reference numeral 32 in FIG. 11B), or the camera 4 must be shifted (reference numeral 33 in FIG. 11B), or the flat stage 5 must be shifted (reference numeral 34 in FIG. 11B).

In the coplanarity measuring apparatus denoted by reference numeral 32 in FIG. 11B, the number of cameras 4 must be increased with an increase in mold size of the SMD 8. In addition, with an increase in number of cameras 4, the numbers of camera controllers, camera drivers, and memories are increased, resulting in an increase in the cost of equipment.

In the coplanarity measuring apparatuses denoted by reference numerals 33 and 34 in FIG. 11B, since image processing and coplanarity calculation are performed while the camera 4 or the flat stage 5 are shifted, vibrations of an operating portion deteriorate the measurement precision. In addition, since the number of shift steps is increased with an increase in the mold size of the SMD 8, the measurement time is undesirably prolonged.

SUMMARY OF THE INVENTION

It is an object of the present invention to provide a coplanarity measuring apparatus which does not require any driving section for shifting a camera or flat stage.

It is another object of the present invention to provide a coplanarity measuring apparatus which allows a reduction in cost of equipment such as a camera and circuit parts, and can prevent an increase in cost of equipment even if the size of an IC package is increased.

It is still another object of the present invention to provide a coplanarity measuring apparatus which can accurately measure coplanarity at high speed.

In order to achieve the above objects, according to the present invention, there is provided a coplanarity measuring apparatus comprising image converting means for converting a transmission image of lead end portions of a surface-mount type IC package into image data, an optical lens mechanism for vertically enlarging a transmission image, of the lead end portions, which is projected by the image converting means, and horizontally reducing the vertically enlarged transmission image, image processing means for converting the image data output from the image converting means into binary data and forming a profile, and arithmetic operating means for calculating a coplanarity from the profile formed by the image processing means and checking whether a product is defective.

BRIEF DESCRIPTION OF THE DRAWINGS

FIG. 4 is a view showing a transmission image, of the state in FIG. 3, obtained when the light source is turned on;

FIGS. 11A and 11B are views for explaining a coplanarity measuring apparatus.

DESCRIPTION OF THE PREFERRED EMBODIMENTS

The present invention will be described below with reference to the accompanying drawings.

Figure 1:
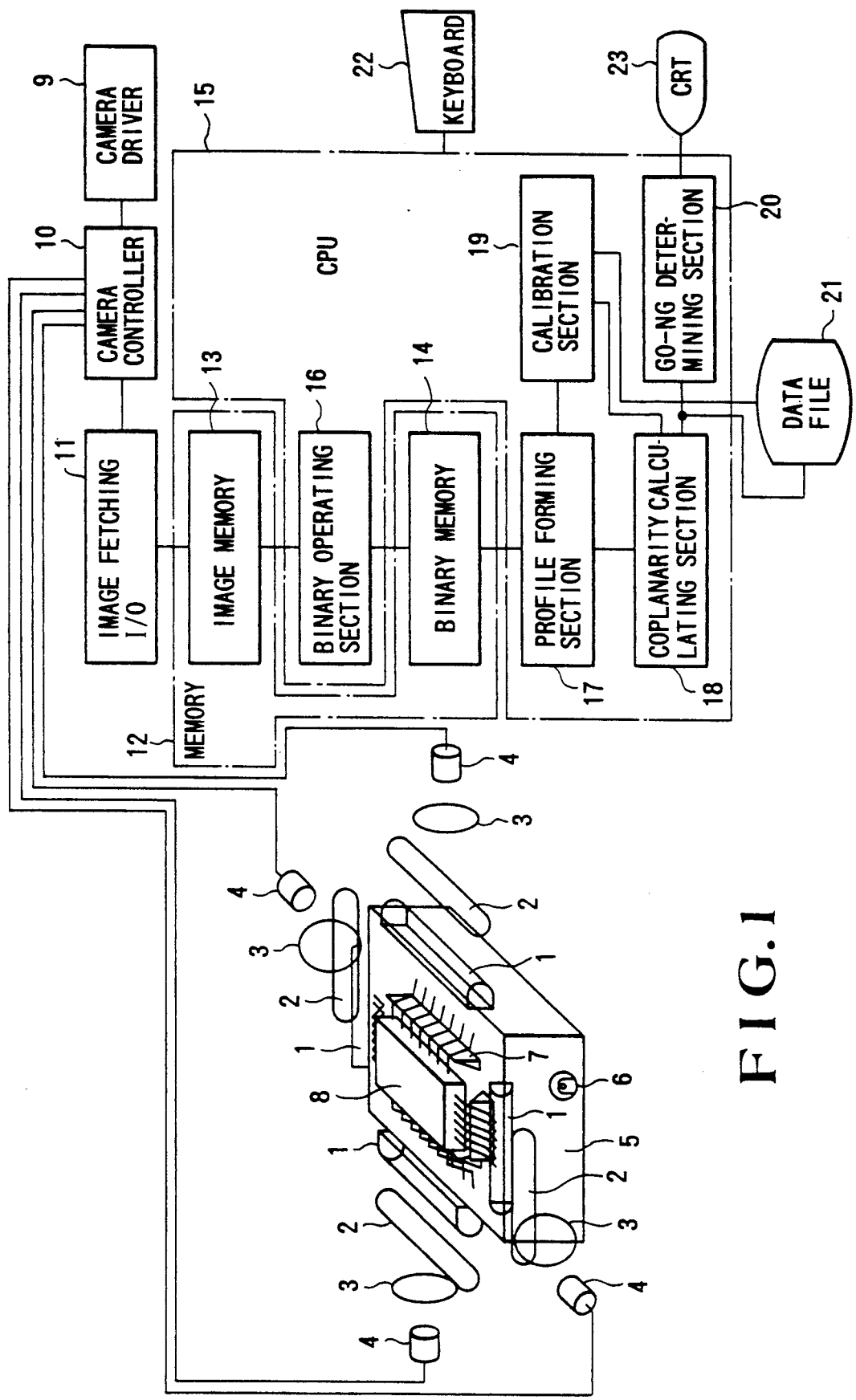
FIG. 1 is a block diagram showing the first embodiment of the present invention.
Figure 2:
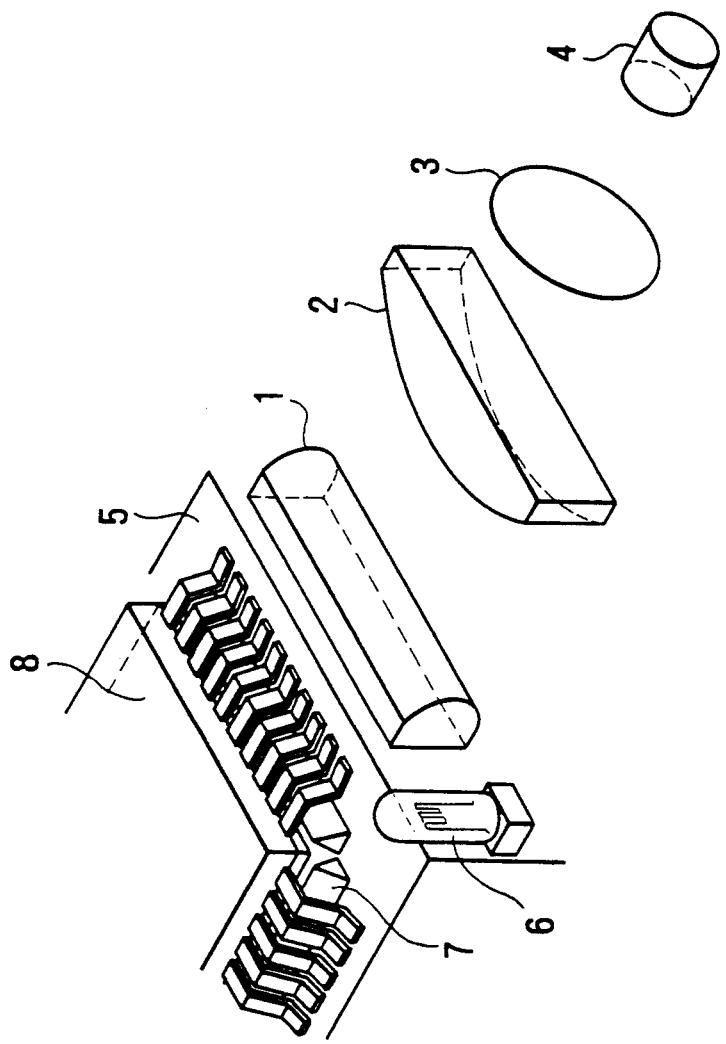
FIG. 2 is a view showing a detailed arrangement of a lens system in FIG. 1.
Figure 3:
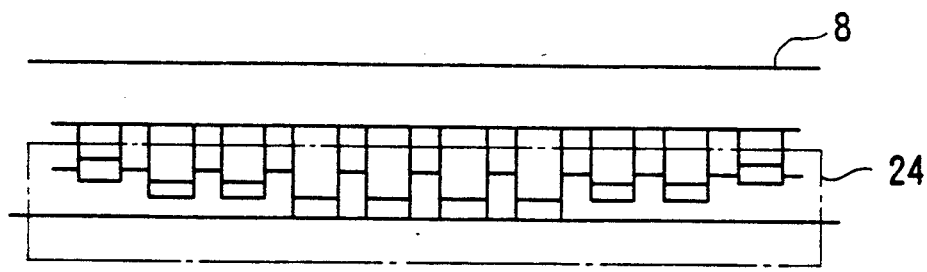
FIG. 3 is a view showing a state of one side of an SMD when viewed from the direction of a camera while a light source is OFF.
Figure 4:
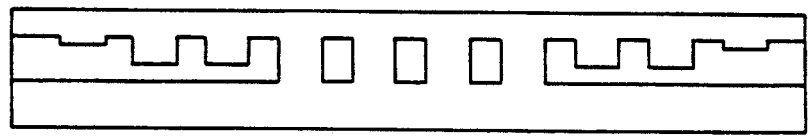
Figure 5:
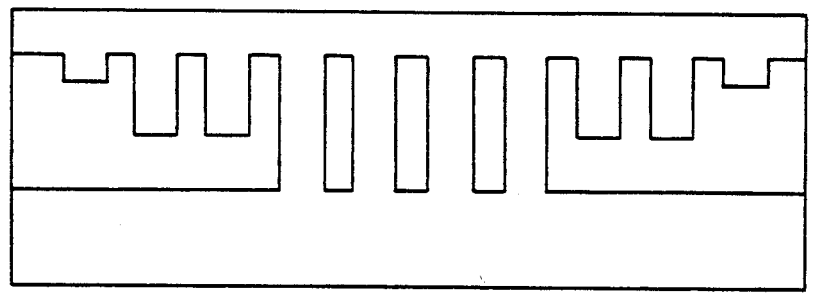
FIG. 5 is a view showing a transmission image obtained by enlarging the image in FIG. 4 by using a vertical component enlarging cylindrical lens.
Figure 6:
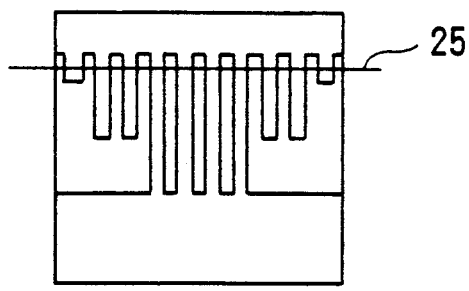
FIG. 6 is a view showing a transmission image obtained by reducing the image in FIG. 5 by using a horizontal component reducing cylindrical lens.
Figure 7:
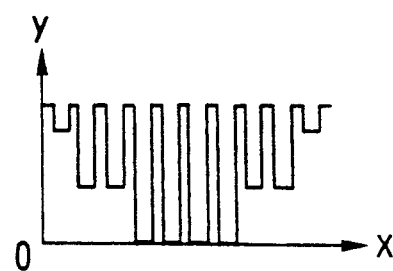
FIG. 7 is a view showing a vertical profile obtained by vertically accumulating bright points of the binary image in FIG. 6.
Figure 8:
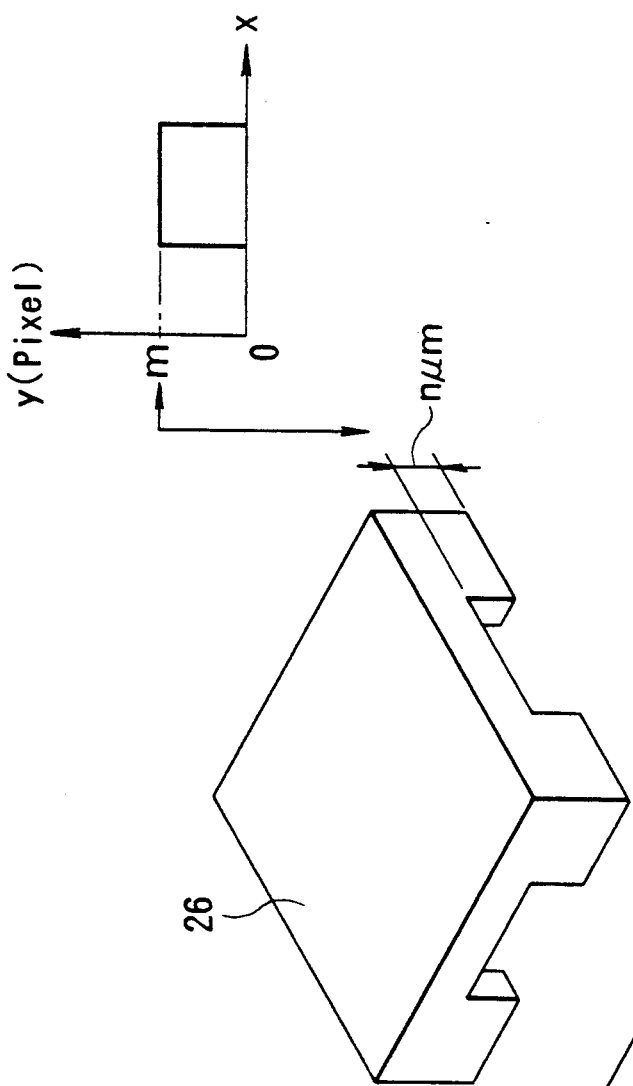
FIG. 8 is a perspective view of a calibration jig.

FIG. 1 shows the first embodiment of the present invention. FIG. 2 shows a detailed arrangement of a lens system (a vertical component enlarging cylindrical lens 1 to an SMD 8). FIG. 3 shows a state of one side of the SMD 8 when viewed from the direction of a camera 4 while a light source 6 is OFF. FIG. 4 shows a transmission image, of the state in FIG. 3, obtained when the light source 6 is turned on. FIG. 5 shows a transmission image obtained by enlarging the image in FIG. 4 by using the vertical component enlarging cylindrical lens 1. FIG. 6 shows a transmission image obtained by reducing the image in FIG. 5 by using a horizontal component reducing cylindrical lens 2. FIG. 7 shows a vertical profile obtained by vertically accumulating bright points in the binary image shown in FIG. 6. FIG. 8 shows a calibration jig.

Referring to FIGS. 1 and 2 light emitted from the light source 6 is scattered in four directions by a semitranslucent diffusion resin 7 on a flat stage 5 consisting of a metal. The semitranslucent diffusion resin 7 is arranged in accordance with the taper of a lower mold of the SMD 8 so that the SMD 8 can be manually fixed without performing position shift correction or $\theta$ correction with respect to the camera 4.

FIG. 3 shows an image, of lead end portions of the SMD 8 and the flat stage 5, which corresponds to one side of the SMD (one camera 4) and is observed while the light source 6 is OFF and no lens system is arranged. Reference numeral 24 in FIG. 3 denotes a region to be processed by the vertical component enlarging cylindrical lens 1. The transmission image shown in FIG. 4 corresponds the region 24 in a state wherein the light source 6 is turned on.

The transmission image shown in FIG. 5 is obtained by enlarging only the vertical components of the image shown in FIG. 3 three times by using vertical component enlarging cylindrical lens. This image is input to the horizontal component reducing cylindrical lens 2.

The transmission image show in FIG. 6 is obtained by reducing only the horizontal components ⅓ times by using the horizontal component reducing cylindrical lens 2. This image is input to a correction macro lens 3.

In general, a cylindrical lens has a high curvature (small curvature radius), and an image is enlarged (convex lens) or reduced (concave lens) in size, as compared with an actual image, from the center of the lens to a peripheral portion, thus causing errors. For this reason, error amounts at the respective points on the surface of the cylindrical lens are calculated from its curvature, and the correction macro lens 3 having a curvature (error) for correcting the errors is manufactured and added to the lens system.

A transmission image obtained by correcting the image shown in FIG. 6 using the correction macro lens 3 is projected on the surface of the camera 4.

Each camera 4 is driven by a camera controller 10 and a camera driver 9. All transmission images, on the cameras 4, corresponding to four sides (four cameras 4) are recorded, as multi-valued data, on an image memory of a memory 12 through the camera controller 10 and an image fetching I/O 11.

A binary operating section 16 converts the multi-valued data recorded in the image memory 13 into binary data in accordance with a threshold level registered by a user by means of a keyboard 22, and registers the resulting binary data in a binary memory 14.

A profile forming section 17 serves to form a frequency profile by vertically accumulating bright points of the binary image registered in the binary memory 14. FIG. 7 shows a profile formed from the transmission image in FIG. 6.

In a CPU 15 and the memory 12, all image operations are performed in units of pixels. In order to convert a measurement value into $\mu m$, a resolution ($\mu m$/pixel) must be calculated and stored in a data file to be multiplied in calculation of a coplanarity.

A calibration section 19 measures a calibration jig 26 (FIG. 8) whose dimensions are registered in a data file 21, and obtains a resolution from the resulting profile. More specifically, the calibration section 19 counts a number m of bright points on the profile corresponding to an n-$\mu m$ notched portion, and performs a calculation of "n/m", thus obtaining a resolution. The section 19 then registers the obtained data in the data file 21.

A coplanarity calculating section 18 calculates the float amounts of the respective leads on the basis of the binary data registered in the binary memory 14 and the vertical profile formed by the profile forming section 17, and retrieves the maximum value from the float amounts, thus calculating the coplanarity of the SMD 8.

More specifically, the coplanarity calculating section 18 scans all x coordinates from a position where a bright point changes to a dark point to a position where the dark point changes to a bright point again along a scanning line 25 so as to obtain the accumulation degrees of the x coordinates on a vertical profile, and retrieves the minimum value as the float amount of one lead. When scanning of the four sides is completed, the maximum value is retrieved from all lead float amounts, and multiplies it by the resolution registered in the data file 21, thus calculating a coplanarity.

A GO-NG determining section 20 compares the coplanarity obtained by the coplanarity calculating section 18 with a standard value registered in the data file 21 by a user in advance. If the obtained coplanarity is the standard value or less, the section 20 determines that the corresponding product is good. In the coplanarity exceeds the standard value, the section 20 determines that the corresponding product is defective. The determination result is then displayed on a CRT 23.

Figure 10:
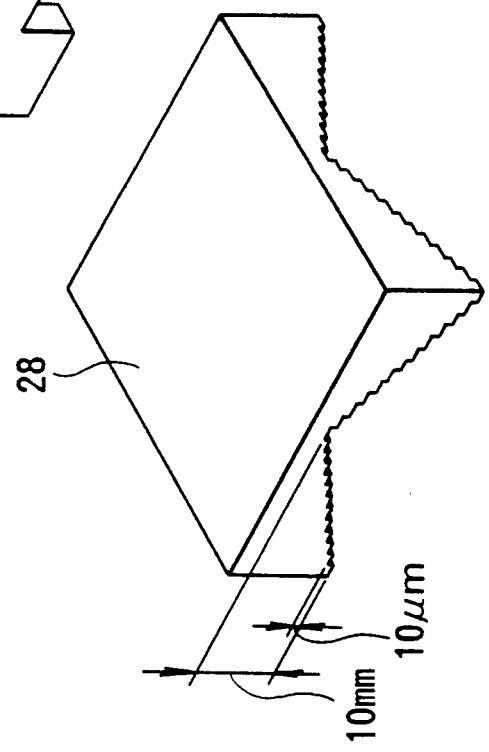
FIG. 10 is a perspective view of a jig for forming curvature correction/data.
Figure 9:
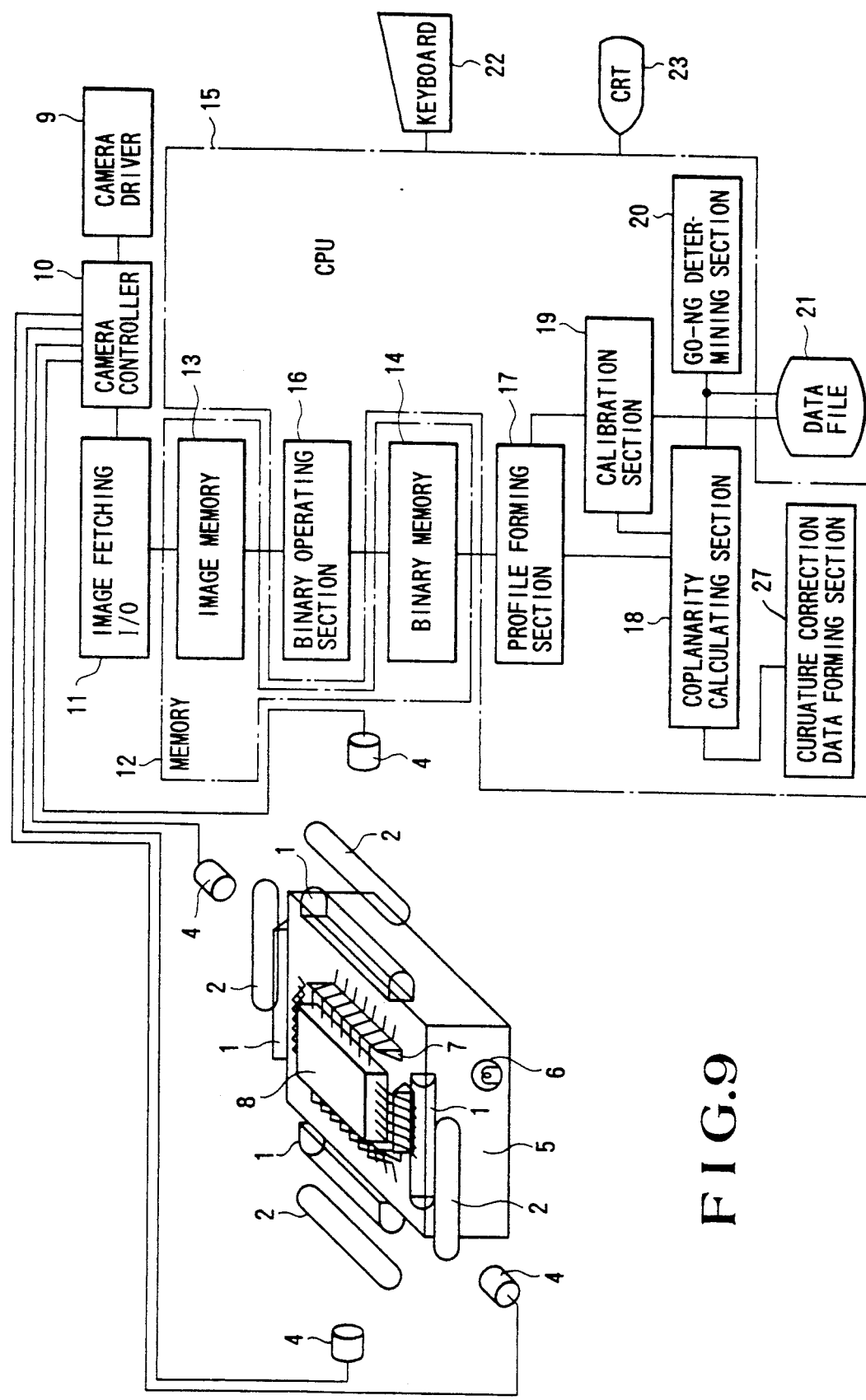
FIG. 9 is a block diagram showing the second embodiment of the present invention.

FIG. 9 shows a schematic arrangement of the second embodiment of the present invention wherein the correction macro lens 3 in the coplanarity measuring apparatus of the first embodiment is replaced with a mechanism (curvature correction table) for performing curvature correction by means of software in a CPU 15. FIG. 10 shows a curvature correction data forming jig 28 used to form curvature correction data.

The processing for obtaining the transmission image shown in FIG. 6 which is formed through the vertical component enlarging cylindrical lens 1 and the horizontal component reducing cylindrical lens 2 in this embodiment is the same as that in the first embodiment, and hence a description thereof will be omitted. In this embodiment, the transmission image in FIG. 6 is directly projected on the surface of a camera 4 while the image includes errors.

In addition, since the processing for obtaining the vertical profile shown in FIG. 7, and the processing in a calibration section in the second embodiment are the same as those in the first embodiment, a description thereof will be omitted.

A curvature correction data forming section 27 serves to form a data table for correcting errors based on the curvatures of a vertical component enlarging cylindrical lens 1 and a horizontal component reducing cylindrical lens 2.

More specifically, a jig 28 (FIG. 10) having portions stepped every 10 $\mu m$ in the range of 0 $\mu m$ to 1.0 mm is used, and a float amount (actual value) of each portion of the jig 18 is registered in a data file 21. Thereafter, the jig 28 is arranged on a flat stage 5 and is imaged to form its profile. Each value based on the profile is multiplied by a resolution obtained by a calibration section 19 to calculate a measurement value (float amount) at each stepped portion of the jig 28. The float amounts registered in the data file 21 are respectively subtracted from the calculation results to obtain the error amounts of the vertical components in 10 μm with respect to the actual values. The obtained error amounts and the calculation results from the apparatus are registered, as a curvature correction data table in which the error amounts and the calculation results have a one-to-one correspondence, in the data file 21 with the calculation results used as indexes.

A coplanarity calculating section 18 calculates the float amounts of the respective leads on the basis of the binary data, of an SMD 8, registered in a binary memory 14, and a vertical profile formed by a profile forming section 17, and retrieves the maximum value from the float amounts, thereby calculating the coplanarity of the SMD 8.

More specifically, the coplanarity calculating section 18 scans all x coordinates from a position where a bright point changes to a dark point to a position where the dark point changes to a bright point again along a scanning line 25 (FIG. 6) so as to obtain the accumulation degrees of the x coordinates on a vertical profile, and retrieves the minimum value as the float amount of one lead. When scanning of the four sides is completed, the maximum value is retrieved from all lead float amounts, and multiplies it by the resolution registered in the data file 21, thus calculating a preliminary coplanarity In addition, a data table, in the data file 21, which has an index closest to the preliminaty coplanarity is referred to retrieve a correction value corresponding to the index. The correction value is then subtracted from the preliminary coplanarity to obtain a correct coplanarity.

Since the processing in a GO-NG determining section 20 is the same as that in the first embodiment, a description thereof will be omitted.

Since the second embodiment does not use the correction macro lens 3, the cost of the apparatus can be reduced as compared with the first embodiment.

As has been described above, according to the present invention, since an image of one side can be processed by one camera without arranging a driving section, the cost of equipment can be reduced, and a coplanarity can be accurately measured at high speed.

What is claimed is:

1. A coplanarity measuring apparatus comprising:
   image converting means for converting a transmission image of lead end portions of a surface-mount type IC package into image data;
   an optical lens mechanism, for vertically enlarging a transmission image, of the lead end portions, which is projected by said image converting means, and horizontally reducing the vertically enlarged transmission image;
   said optical lens mechanism comprising a vertical component enlarging cylindrical lens and a horizontal component reducing cylindrical lens;
   image processing means for converting the image data output from said image converting means into binary data and forming a profile;
   arithmetic operating means for calculating a coplanarity from the profile formed by said image processing means and checking whether a product is defective; and
   curvature correction means comprising a data table having stored therein correction values for errors based on the curvatures of said cylindrical lenses, with a calculated result of coplanarity being used as an index, and said arithmetic operating means for calculating a preliminary coplanarity from the formed profile, and from said curvature correction data table for obtaining a correct coplanarity.

2. An apparatus according to claim 1, further comprising curvature correction data forming means for obtaining correction values for the errors by actual measurement, and registering the correction values in said curvature correction data table.

3. An apparatus according to claim 1, wherein said image processing means comprises a binary operating section for converting multi-valued data of a fetched transmission image into binary data in accordance with a threshold level registered in advance, and a profile forming section for forming a vertical profile by vertically accumulating bright points, of the binary data, which respectively represent float amounts of lead end portions.

4. An apparatus according to claim 1, wherein said arithmetic operating means comprises a coplanarity calculating section for calculating float amounts of the respective lead portions on the basis of a vertical profile from said image processing section, retrieving a maximum value from the float amounts, and obtaining a coplanarity on the basis of the retrieved maximum value, and a GO-NG determining section for comprising the obtained coplanarity with a standard value registered in advance to check whether the product is defective.

5. An apparatus according to claim 4, wherein said arithmetic operating means comprises a calibration section for calculating a resolution used to convert measurement data arranged in units of pixels into data in μm, and said complanarity calculating section obtains a coplanarity by multiplying the retrieved maximum value by the resolution.

6. An apparatus according to claim 1, wherein said image converting means and said optical lens mechanism are arranged along each of four sides of the IC package.

7. A coplanarity measuring apparatus characterized by comprising:
   image converting means for converting a transmission image of lead end portions of a surface-mount type IC package into image data;
   an optical lens mechansim, for vertically enlarging a transmission image, of the lead end portions, which is projected by said image converting means, and horizontally reducing the vertically enlarged transmission image;
   said optical lens mechansim comprises a vertical component enlarging cylindrical lens and a horizontal component reducing cylindrical lens;
   image processing means for converting the image data output from said image converting means into binary data and forming a profile;
   said image processing means comprising a binary operating section for converting multi-valued data of a fetched transmission image into binary data in accordance with a threshold level which is registered in advance, and a profile forming section for forming a vertical profile by vertically accumulating bright points, of the binary data, which respectively represent float amounts of lead end portions;

arithmetic operating means for calculating a coplanarity from the profile formed by said image processing means and checking whether a product is defective;

a curvature correction means including a data table having stored therein correction values for errors based on the curvatures of said cylindrical lenses, with a calculated result of coplanarity being used as an index, and said arithmetic operating means for calculating a preliminary coplanarity from the formed profile, and from said curvature correction data table for obtaining a correct coplanarity;

said arithmetic operating means further comprising a coplanarity calculating section for calculating float amounts of the respective lead portions on the basis of a vertical profile from said image processing section, retrieving a maximum value from the float amounts, and obtaining a coplanarity on the basis of the retrieved maximum value, and a GO-NO/GO determining section from comparing the obtained coplanarity with a standard value registered in advance to check whether the product is defective;

said arithmetic operating means further comprising a calibration section for calculating a resolution which is used to convert measurement data arranged in units of pixels into data in $\mu m$, and said coplanarity calculating section obtains a coplanarity by multiplying the retrieved maximum value by the resolution.

* * * * *